United States Patent Office 3,600,468
Patented Aug. 17, 1971

3,600,468
ADHESIVE BLEND COMPRISING AN ETHYLENE/UNSATURATED ACID COPOLYMER AND AN ETHYLENE/UNSATURATED ESTER COPOLYMER
Reinhard D. Böhme, Midland, Mich., assignor to The Dow Chemical Company, Midland, Mich.
No Drawing. Filed Oct. 31, 1968, Ser. No. 772,376
Int. Cl. C08f 37/18
U.S. Cl. 260—897                                    7 Claims

ABSTRACT OF THE DISCLOSURE

An adhesive blend of polymers having an adhesiveness in terms of peel strength greater than the sum of the peel strengths of each polymer in the blend comprising a copolymer of ethylene and an $\alpha,\beta$-ethylenically unsaturated carboxylic acid such as acrylic acid and a copolymer of ethylene and an alkyl ester of an $\alpha,\beta$-ethylenically unsaturated carboxylic acid such as ethyl acrylate. The adhesive blend is prepared by masticating the copolymers in a Banbury mixing apparatus or the like.

---

This invention relates to polymer blends. In one aspect, this invention relates to adhesive compositions of matter. In another aspect, this invention relates to adhesive blends of two copolymers.

The art of adhesives is replete with various polymeric materials useful for bonding two or more metal articles together, two or more non-metal articles together, and metal articles to non-metal articles. One such adhesive which has enjoyed rather widespread commercial success is a copolymer of ethylene and an ethylenically unsaturated carbxoylic acid prepared by either random polymerization techniques or by graft polymerization techniques. The ethylene-acrylic acid copolymer species of this class of adhesives is particularly effective for bonding materials together in many different fields of art.

According to this invention, an adhesive polymer blend having an adhesiveness greater than the sum of the adhesiveness of each polymer in the blend comprises a copolymer of ethylene and an $\alpha,\beta$-ethylenically unsaturated carboxylic acid and a copolymer of ethylene and an alkyl ester of an $\alpha,\beta$-ethylenically unsaturated carboxylic acid. While a copolymer of ethylene and alkyl ester of an $\alpha,\beta$-ethylenically unsaturated carboxylic acid has no substantial adhesiveness in and of itself as compared to a copolymer of ethylene and an unsaturated acid, when such a copolymer is blended in certain specified amounts with an adhesive copolymer of ethylene and an $\alpha,\beta$-ethylenically unsaturated carboxylic acid the adhesiveness of the blend is greater than the sum of the adhesiveness of each copolymer. When the ethylene-alkyl ester copolymer is blended in certain preferred amounts according to the invention the adhesiveness of the blend is two or more times as great as the adhesiveness of the ethylene-acid adhesive copolymer. The synergism of the blend insofar as adhesiveness is concerned is surprising and unexpected since one would predict the adhesiveness of the blend to be less than the adhesiveness of the ethylene-acid adhesive copolymer because the concentration of the adhesive copolymer in the blend is reduced due to the presence of the ethylene-alkyl ester copolymer.

Accordingly, it is an object of this invention to provide an adhesive composition.

Another object of this invention is to improve the adhesiveness of a copolymer of ethylene and an $\alpha,\beta$-ethylenically unsaturated carboxylic acid.

These and other objects of the invention will become apparent to one skilled in the art after studying the following detailed description and the appended claims.

The adhesive composition of this invention comprises a blend of a first copolymer of ethylene and an $\alpha,\beta$-ethylenically unsaturated carboxylic acid having a Melt Index (ASTM D–1238–62T, Condition E, grams/10 minutes) of between about 4.6 and about 20 and a second copolymer of ethylene and an alkyl ester of an $\alpha,\beta$-ethylenically unsaturated carboxylic acid having a Melt Index of between about 2.5 and about 18.5. The adhesive composition is characterized by having an adhesiveness in terms of peel strength which is greater than the sum of the peel strengths of each of the copolymers in the blend. The ethylene-alkyl ester copolymer is present in the blend in an amount which produces a blend having an adhesiveness in terms of peel strength which is greater than the sum of the peel strength of each of the copolymers in the blend. The actual amount of the substantially non-adhesive ethylene-alkyl ester copolymer which can be tolerated in the blend and yet have a blend which exhibits this unusual adhesiveness depends upon such factors as the Melt Index of each of the copolymers, the specific copolymers which are blended together, the adhesiveness of the ethylene-acid adhesive copolymer of the blend, and the like. It has been discovered that blends of certain specific copolymers each having a particular Melt Index exhibit an adhesiveness which is greater than the sum of the adhesiveness of each copolymer in the blend when the ethylene-alkyl ester copolymer is present in the blend in amounts up to about 85 weight percent based upon the total weight of the blend. Insofar as the lower limit for the ethylene-alkyl ester copolymer in the blend, the adhesiveness of the blend is improved when the ethylene-alkyl ester copolymer is present in the blend in minute quantities such as, for example, with as little as about 0.5 weight percent ethylene-alkyl ester copolymer based upon the total weight of the blend.

As indicated above, the amount of ethylene-alkyl ester copolymer which is blended with the ethylene-acid copolymer to produce a blend having an adhesiveness greater than the sum of the adhesiveness of each copolymer depends at least in part upon the Melt Indexes of each of the copolymers. Generally speaking, the maximum proportion of ester copolymer in the blends having adhesiveness greater than the sum of adhesiveness of the constituent copolymers varies inversely and quite sharply with the Melt Index of the ester copolymer in the range from about 2 to about 20 and directly to a much smaller extent with the Melt Index of the acid copolymer. Thus, for example, it has been discovered that a blend of a copolymer of ethylene and acrylic acid having a Melt Index of about 20 and a copolymer of ethylene and ethyl acrylate having a Melt Index of about 2.5 has an adhesiveness greater than the sum of the adhesiveness of each copolymer when the copolymer of ethylene and ethyl acrylate is present in the blend in amounts up to about 85 weight percent based upon the total weight of the blend. Similarly, it has been discovered that a blend of, for example, a copolymer of ethylene and acrylic acid having a Melt Index of about 4.6 and a copolymer of ethylene and ethyl acrylate having a Melt Index of about 2.5 exhibits an adhesiveness greater than the sum of the adhesiveness of each of the copolymers when the ethylene-ethyl acrylate copolymer is present in the blend in amounts up to about 70 weight percent based upon the total weight of the blend. As another example, it was discovered that a blend of a copolymer of ethylene and acrylic acid having a Melt Index of about 4.6 and a copolymer of ethylene and ethyl acrylate having a Melt Index of about 18.5 exhibits an adhesiveness greater than the sum of the adhesiveness of each copolymer when the ethylene-ethyl acrylate copolymer is present in the blend in amounts up to about 20 weight percent based upon the total weight of the blend.

The copolymers of ethylene and $\alpha,\beta$-ethylenically unsaturated carboxylic acid employed in preparing the adhesive blend of this invention can be either random copolymers, graft copolymers, or mixtures thereof. These copolymers can be obtained commercially or they can be prepared by processes well known in the art. While the invention is not to be bound by any particular technique for preparing the copolymers, one exemplary technique for preparing the random variety involves subjecting a mixture of ethylene monomers and suitable acid monomers to a high pressure such as between about 500 and about 100 atmospheres and to an elevated temperature such as between about 100° and about 400° C. in the presence of a suitable free radical initiator such as lauroyl peroxide, ditertiary butyl peroxide, or $\alpha,\alpha$-azobisisobutyronitrile. Reaction conditions can be varied to produce random copolymers having the desired molecular weight. Exemplary techniques for producing graft copolymers of ethylene and $\alpha,\beta$-ethylenically unsaturated carboxylic acids useful in preparing the novel blend of this invention are described in U.S. Pats. 3,177,269 and 3,270,090, the disclosures of which are both specifically incorporated herein by reference.

It is generally preferred that the $\alpha,\beta$-ethylenically unsaturated carboxylic acids which are copolymerized with ethylene or which are grafted onto polyethylene chains have between 3 and about 8 carbon atoms per molecule. Exemplary $\alpha,\beta$-ethylenically unsaturated carboxylic acids which can be employed include acrylic, methacrylic, ethacrylic, crotonic, isocrotonic, tiglic, angelic, senecioic, and the like.

The relative concentrations of the ethylene and the $\alpha,\beta$-ethylenically unsaturated carboxylic acid in the copolymer of the blend can vary over wide limits and is largely a matter of personal choice dictated by such factors as, for example, the adhesiveness desired, economics, and the like. It is generally preferred that the ethylene be present in the copolymer in amount between about 70 and about 99.5 percent by weight and that the $\alpha,\beta$-ethylenically unsaturated carboxylic acid be present in the copolymer in an amount between about 0.5 and about 30 percent by weight.

The copolymers of ethylene and alkyl ester of an $\alpha,\beta$-ethylenically unsaturated carboxylic acid which are blended with the copolymer of ethylene and $\alpha,\beta$-ethylenically unsaturated carboxylic acid to produce the adhesive composition of this invention can be obtained commercially or they can be prepared by polymerization processes well known in the art. The alkyl moieties or portions of the alkyl ester of the $\alpha,\beta$-ethylenically unsaturated carboxylic acid each have up to about 8 carbon atoms. Exemplary alkyl radicals of the ester include methyl, propyl, butyl, pentyl, iso-pentyl, heptyl, octyl, and the like. The $\alpha,\beta$-ethylenically unsaturated carboxylic acid of the ester has between about 3 and about 8 carbon atoms per molecule. Exemplary acids within this class include acrylic, methacrylic, maleic, fumaric, itaconic, crotonic, isocrotonic, tiglic, angelic, senecioic, and the like. Exemplary alkyl esters of $\alpha,\beta$-monoethylenically unsaturated carboxylic acids which can be copolymerized with ethylene to produce that copolymer of the blend include methyl methacrylate, ethyl acrylate, n-pentyl acrylate, iso-octyl acrylate, iso-propyl ethacrylate, n-butyl methacrylate, and the like. It is generally preferred that the copolymer of ethylene and the alkyl ester contain between about 0.5 and about 30 weight percent combined alkyl ester and between about 70 and about 99.5 weight percent combined ethylene.

The term used to describe the acid portion of the copolymers which are blended together to produce the adhesive composition of this invention is intended to include suitable $\alpha,\beta$-ethylenically unsaturated anhydrides such as maleic anhydride and the like. Although the anhydrides are not technically speaking carboxylic acids because they do not have a hydrogen atom attached to the carboxyl groups, they are considered to be an acid for the purposes of this invention because their chemical reactivity is that of an acid. The acid portions of the copolymers is also intended to include mono esters of the carboxylic acids such as methyl hydrogen maleate, methyl hydrogen fumarate, ethyl hydrogen fumarate, and the like.

As indicated with respect to the ethylenecarboxylic acid copolymer of the adhesive blend, the copolymer of ethylene and alkyl ester of the unsaturated acid can also be of either the random or graft varieties.

The adhesive blend of this invention can be prepared by mixing the copolymers in a variety of different ways and under varying conditions of temperature and pressure. For example, the adhesive composition can be prepared by blending the copolymers in a Banbury mixer or by admixing them in a roll mill to produce a homogeneous blend having the desired concentrations of the two copolymers. The adhesive composition can also be prepared by feeding the two copolymers to an extruder which mixes the two materials during plastification. The blends can also contain other materials such as fillers, pigments, dyes, and the like. These materials can be added before, during, or after the preparation of the blend.

The blend can be employed as an adhesive in a variety of different forms such as, for example, in solution, as a latex, as a film, as an extruded coating, as a fluidized bed coating, and the like. The amount of the adhesive composition which is employed will depend to a large degree upon the type and size of the materials which are being bonded together. The adhesive blends of this invention find utility in, for example, the laminating art for bonding two or more materials together, in the coating art for providing an adhesive layer on a substrate, in the cable fabrication art for bonding the layers of a cable together, and the like.

Copolymers of ethylene containing about 8 weight percent combined acrylic acid and having a Melt Index of between 4.6 and about 20 g./10 minutes are particularly suited for preparing the adhesive blends of this invention. Similarly, copolymers of ethylene containing about 8 weight percent combined ethyl acrylate having a Melt Index of between about 2.5 and about 18.5 g./10 are likewise particularly suitable for preparing the adhesive compositions of this invention.

The following examples are illustrative of several adhesive blends prepared according to the teachings of this invention. It is to be understood that these examples are for the purpose of illustration only and should not be construed as limiting of the invention.

EXAMPLES I THROUGH IV

A series of runs was made to illustrate the adhesiveness of several polymer blends of the invention and to compare this adhesiveness with the adhesiveness of the individual polymers in the blends. In preparing the blends, the polymers were admixed in a roll mill in varying relative proportions and the blends compression molded to produce several batches of films about 5 mils thick. The relative proportions of the polymers were different for the several batches of film. Films of the individual polymers of the blends were prepared in the same manner.

The adhesiveness of the individual polymers and the blends was determined by positioning the films between 8-mil thick aluminum strips to form composites which were laminated together by placing each composite between the platens of a hydraulic press and subjecting them to a pressure of about 8000 p.s.i. and a temperature of about 180° C. for a period of time to insure bonding. Four composites were prepared and laminated together for each type of film produced. The several laminates were removed from the press and tested for peel strength in an Instron tensiometer according to ASTM test procedure D 903–49 except that a cross-head separation rate of 4 inches per minutes was used. The peel strengths of the several laminates are reported in Table I below.

TABLE I

| | Film composition | | |
|---|---|---|---|
| | Ethylene-acrylic acid [1] random copolymer (percent by weight) | Ethylene-ethyl acrylate [2] random copolymer (percent by weight) | Peel strength [3] (Lbs./in.-width) |
| Control Number 1 | 100 | 0 | 28.3 |
| Example: | | | |
| I | 87.5 | 12.5 | 35.8 |
| II | 75 | 25 | 46 |
| III | 60 | 40 | 63 |
| IV | 50 | 50 | 46 |
| Control Number: | | | |
| 2 | 25 | 75 | 16.4 |
| 3 | 12.5 | 87.5 | 13 |
| 4 | 0 | 100 | 1 |

[1] Random copolymer containing 8 percent by weight combined acrylic acid having a melt index of 4.6 g/10 minutes.
[2] Random copolymer containing 8 percent by weight combined ethyl acrylate having a melt index of 2.5 g./10 minutes.
[3] Average of four laminates prepared and tested.

When the data reported in Table I are illustrated graphically by plotting the percent ethylene-ethyl acrylate copolymer in the blend of each film against peel strength, the adhesiveness of the blend is greater than the sum of the adhesiveness of each copolymer when the ethylene-ethyl acrylate copolymer is present in the blend in amounts up to about 70 weight percent. This adhesion of the blends having up to about 70 weight percent ethylene-ethyl acrylate copolymer is surprising and unexpected in view of the peel strength for the ethylene-acrylic acid copolymer alone (Control No. 1) and in view of the peel strength for the ethylene-ethyl acrylate copolymer alone (Control No. 4).

EXAMPLES V THROUGH IX

A series of runs was conducted by the technique outlined in Examples I through IV to illustrate the adhesiveness of other polymer blends of the invention. In these runs, films were made from various blends of a random copolymer of ethylene containing 8.5 percent by weight combined acrylic acid having a Melt Index of about 20 g./10 minutes and a random copolymer of ethylene containing about 8 percent by weight combined ethyl acrylate having a Melt Index of about 2.5 g./10 minutes. Films were also made of the individual polymers in the blends. The laminates were prepared and tested by the same procedure described in Examples I through IV. The peel strengths of the several laminates are reported in Table II below.

TABLE II

| | Film composition | | |
|---|---|---|---|
| | Ethylene-acrylic acid [1] random copolymer (percent by weight) | Ethylene-ethyl acrylate [2] random copolymer (percent by weight) | Peel strength [3] (Lbs./in.-width) |
| Control Number 5 | 100 | 0 | 7.6 |
| Example: | | | |
| V | 90 | 10 | 9.5 |
| VI | 75 | 25 | 12.1 |
| VII | 60 | 49 | 14.5 |
| VIII | 50 | 50 | 18.5 |
| IX | 25 | 75 | 13.4 |
| ont rol Number 6 | 0 | 100 | 1 |

[1] Random copolymer containing about 8.5 percent by weight combined acrylic acid having a melt index of 20 g./10 minutes.
[2] Random copolymer containing about 8 percent by weight combined ethyl acrylate having a melt index of 2.5 g./10 minutes.
[3] Average of four laminates prepared and tested.

When the data reported in Table I are examined graphically by plotting the percent ethylene-ethyl acrylate copolymer in the blend of each film against peel strength it can be seen that the adhesiveness of the blend is greater than the sum of the adhesiveness of each copolymer when the ethylene-ethyl acrylate copolymer is present in the blend in amounts up to about 85 weight percent. The adhesiveness of a blend having up to about 85 weight percent ethylene-ethyl acrylate copolymer is surprising and unexpected in view of the peel strength for the ethylene-acrylic acid copolymer alone (Control No. 5) and in view of the peel strength for the ethylene-ethyl acrylate copolymer alone (Control No. 6).

EXAMPLE X

Another series of runs was conducted according to the procedure outlined in Examples I through IV to illustrate the adhesiveness of a blend of a random copolymer of ethylene containing 8 percent by weight combined acrylic acid having a Melt Index of about 4.6 g./10 minutes and a random copolymer of ethylene containing 8 percent by weight combined ethyl acrylate having a Melt Index of about 18.5 g./10 minutes. The laminates were prepared and tested for peel strength according to the procedure outlined in Examples I through IV. Laminates having the individual polymers of the blend as an inner layer were also prepared and tested. The peel strengths of the several laminates are reported in Table III below.

TABLE III

| | Film composition | | |
|---|---|---|---|
| | Ethylene-acrylic acid [1] random copolymer (percent by weight) | Ethylene-ethyl acrylate [2] random copolymer (percent by weight) | Peel strength [3] (lbs./in.-width) |
| Control Number 7 | 100 | 0 | 28.3 |
| Example X | 87.5 | 12.5 | 48 |
| Control Number: | | | |
| 8 | 75 | 25 | 22.5 |
| 9 | 62.5 | 37.5 | 4.2 |
| 10 | 50 | 50 | 3.8 |
| 11 | 15 | 85 | 5 |
| 12 | 0 | 100 | 5.5 |

[1] Random copolymer containing 8 percent by weight combined acrylic acid having a melt index of 4.6 g./10 minutes.
[2] Random copolymer containing 8 percent by weight combined ethyl acrylate having a melt index of 18.5 g./10 minutes.
[3] Average of four laminates prepared and tested.

When the data reported in Table III are examined graphically by plotting the weight per cent of the ethylene-ethyl acrylate copolymer in the blend against peel strength, the adhesiveness of the blend is improved when the ethylene-ethyl acrylate copolymer is present in the blend in amounts up to about 20 weight percent. The adhesiveness of blends containing up to about 20 weight percent ethylene-ethyl acrylate copolymer is surprising and unexpected in view of the peel strength for the ethylene-acrylic acid copolymer alone (Control No. 7) and in view of the peel strength for ethylene-ethyl acrylate copolymer alone (Control No. 12).

Although the invention has been described in considerable detail, it must be understood that such description is for that purpose only and should not be construed as limiting of the invention.

What is claimed is:

1. An adhesive composition of matter comprising a blend of a first copolymer consisting essentially of ethylene and an $\alpha,\beta$-ethylenically unsaturated carboxylic acid having a Melt Index of between about 4.6 and about 20 and between about 0.5 and about 85 weight percent, based upon the total weight of said blend, of a second copolymer consisting essentially of ethylene and an alkyl ester of an $\alpha,\beta$-ethylenically unsaturated carboxylic acid having a Melt Index of between about 2.5 and about 18.5, said adhesive composition having an adhesiveness in terms of peel strength greater than the sum of the peel strenghts of said first and said second copolymers in said blend.

2. An adhesive composition according to claim 1 wherein said first copolymer contains between about 0.5 and about 30 weight percent combined $\alpha,\beta$-ethylenically unsaturated carboxylic acid, wherein said second copolymer contains between about 0.5 and about 30 weight percent combined alkyl ester of an $\alpha,\beta$-ethylenically unsaturated carboxylic acid, and wherein each alkyl moiety of said second copolymer has up to about 8 carbon atoms.

3. An adhesive composition according to claim 1 wherein the α,β-ethylenically unsaturated carboxylic acid in said first and said second copolymers each has between about 3 and about 8 carbon atoms per molecule, inclusive.

4. An adhesive composition according to claim 1 wherein said first copolymer is a copolymer of ethylene and acrylic acid having a Melt Index of about 20 and said second copolymer is a copolymer of ethylene and ethyl acrylate having a Melt Index of about 2.5.

5. An adhesive composition according to claim 1 whereing said first copolymer is a copolymer of ethylene and acrylic acid having a Melt Index of about 4.6, said second copolymer is a copolymer of ethylene and ethyl acrylate having a Melt Index of about 2.5, and said second copolymer is present in said blend in an amount up to about 70 weight percent based upon the total weight of said blend.

6. An adhesive composition according to claim 1 whereing said first copolymer is a copolymer of ethylene and acrylic acid having a Melt Index of about 4.6, said second copolymer is a copolymer of ethylene and ethyl acrylate having a Melt Index of about 18.5, and said second copolymer is present in said blend in an amount up to about 20 weight percent based upon the total weight of said blend.

7. An adhesive composition according to claim 1 wherein said first and said second copolymers are each random copolymers.

References Cited
UNITED STATES PATENTS

| | | | |
|---|---|---|---|
| 3,437,718 | 4/1969 | Rees | 260—899 |
| 3,365,520 | 1/1968 | Foster et al. | 260—897 |
| 3,485,783 | 12/1969 | Kehe | 260—27 |
| 3,298,855 | 1/1967 | Helin et al. | 260—897 |

SAMUEL H. BLECH, Primary Examiner

C. J. SECCURO, Assistant Examiner

U.S. Cl. X.R.
156—327; 161—216

PO-1050
(5/69)

UNITED STATES PATENT OFFICE
CERTIFICATE OF CORRECTION

Patent No. 3,600,468     Dated    17 August 1971

Inventor(s)   Reinhard D. Bohme

It is certified that error appears in the above-identified patent and that said Letters Patent are hereby corrected as shown below:

In column 5, Table II between lines lines 50 and 65, in the second column after Example VII, delete "49" and in sert -- 40 --.

Signed and sealed this 28th day of March 1972.

(SEAL)
Attest:

EDWARD M. FLETCHER, JR.          ROBERT GOTTSCHALK
Attesting Officer                Commissioner of Patents